United States Patent
Biacs et al.

(10) Patent No.: US 10,935,663 B2
(45) Date of Patent: Mar. 2, 2021

(54) SATELLITE INTEGRITY MONITORING WITH CROWDSOURCED MOBILE DEVICE DATA

(71) Applicant: QUALCOMM Incorporated, San Diego, CA (US)

(72) Inventors: Zoltan Biacs, San Mateo, CA (US); Ning Luo, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 410 days.

(21) Appl. No.: 15/713,155

(22) Filed: Sep. 22, 2017

(65) Prior Publication Data

US 2019/0094371 A1 Mar. 28, 2019

(51) Int. Cl.
  *G01S 19/08* (2010.01)
  *G01S 19/20* (2010.01)
  *G01S 19/11* (2010.01)

(52) U.S. Cl.
  CPC .............. *G01S 19/08* (2013.01); *G01S 19/20* (2013.01); *G01S 19/11* (2013.01)

(58) Field of Classification Search
  CPC .......... G01S 19/08; G01S 19/20; G01S 19/25; G01S 19/11
  See application file for complete search history.

(56) References Cited

U.S. PATENT DOCUMENTS

| 9,113,432 | B2 | 8/2015 | Teed-Gillen et al. | |
| 9,151,824 | B2 | 10/2015 | Gao et al. | |
| 9,182,495 | B2 | 11/2015 | Stevens | |
| 9,332,453 | B2 | 5/2016 | Gao et al. | |
| 2007/0115171 | A1* | 5/2007 | Rahman | G01S 19/20 342/357.58 |
| 2008/0309550 | A1* | 12/2008 | Sairo | G01S 19/51 342/357.27 |
| 2010/0265132 | A1* | 10/2010 | Oehler | G01S 19/20 342/357.58 |
| 2013/0194132 | A1* | 8/2013 | Kim | G01S 19/25 342/357.64 |
| 2015/0145724 | A1* | 5/2015 | Kana | G01S 19/421 342/357.58 |

(Continued)

FOREIGN PATENT DOCUMENTS

| CN | 104914455 A | 9/2015 |
| WO | 2017040076 A1 | 3/2017 |

OTHER PUBLICATIONS

A.J. Van Dierendonck and Per Enge, RTCA SC-159 Wide area integrity Broadcast/Wide Area Differential GPS Status (Year: 1994).*

(Continued)

*Primary Examiner* — Marc Anthony Armand
(74) *Attorney, Agent, or Firm* — Weaver Austin Villeneuve & Sampson LLP

(57) ABSTRACT

Disclosed are a system, apparatus, and method for monitoring integrity of satellites, and global navigation satellite systems (GNSS). One or more satellites in one or more GNSS are monitored based on a reference crowdsourced integrity report. One or more satellite integrity metrics are determined for the one or more satellites based at least on signals from the one or more satellites. A position of the mobile device is estimated. The position of the mobile device and the one or more satellite integrity metrics are provided.

24 Claims, 4 Drawing Sheets

(56) References Cited

U.S. PATENT DOCUMENTS

2016/0011318 A1   1/2016  Cohen et al.
2018/0259648 A1*  9/2018  Skalicky ............... G01S 19/20
2019/0004180 A1*  1/2019  Jokinen ................ G01S 19/07

OTHER PUBLICATIONS

International Search Report and Written Opinion—PCT/US2018/048547—ISA/EPO—dated Mar. 6, 2019.

* cited by examiner

SATELLITE INTEGRITY MONITORING WITH CROWDSOURCED MOBILE DEVICE DATA

FIELD

The subject matter disclosed herein relates generally to monitoring integrity of individual satellite vehicles and constellations, and more specifically to monitoring with crowdsourced mobile device data.

BACKGROUND

Mobile devices such as consumer mobile phones often have integrated global navigation satellite system (GNSS) based positioning features to assist users in determining geographic location. To determine location from GNSS typically consists of receiving GNSS measurements and data from one or more of GNSS satellite constellation systems (e.g., Global Positioning System (GPS), Globalnaya Navigazionnaya Sputnikovaya Sistema (GLONASS), BeiDou, Quasi-Zenith Satellite System (QZSS), and Galileo). Some GNSS constellations may be more error prone than others, however even the most accurate GNSS constellations may have an errant satellite vehicle (SV) which may degrade the positioning performance when utilized by a mobile device. Therefore, it is advantageous to improve GNSS positioning for a high quality user experience on mobile devices.

BRIEF SUMMARY

Some embodiments discussed herein provide for a mobile device to utilize crowdsourced data to verify the integrity of one or more GNSS satellite vehicles (SVs) and/or a GNSS constellation.

In one aspect, a method for a mobile device to monitor satellite integrity is described, the method comprising: obtaining one or more satellites in one or more GNSS to monitor based on a reference crowdsourced integrity report; determining, at the mobile device, one or more satellite integrity metrics for the one or more satellites based at least on signals from the one or more satellites; estimating a position of the mobile device; and providing the position of the mobile device and the one or more satellite integrity metrics.

In yet another aspect, a device to monitor satellite integrity, the device comprising: memory; and a processor coupled to the memory and the processor is configured to: obtain one or more satellites in one or more GNSS to monitor based on a reference crowdsourced integrity report; determine, at the mobile device, one or more satellite integrity metrics for the one or more satellites based at least on signals from the one or more satellites; estimate a position of the mobile device; and provide the position of the mobile device and the one or more satellite integrity metrics.

In a further aspect, a machine readable non-transitory storage medium has stored therein program instructions that are executable by a processor to: obtain one or more satellites in one or more GNSS to monitor based on a reference crowdsourced integrity report; determine, at the mobile device, one or more satellite integrity metrics for the one or more satellites based at least on signals from the one or more satellites; estimate a position of the mobile device; and provide the position of the mobile device and the one or more satellite integrity metrics.

In a further aspect, an apparatus to verify satellite integrity comprises: means for obtaining one or more satellites in one or more GNSS to monitor based on a reference crowdsourced integrity report; means for determining, at the mobile device, one or more satellite integrity metrics for the one or more satellites based at least on signals from the one or more satellites; means for estimating a position of the mobile device; and means for providing the position of the mobile device and the one or more satellite integrity metrics.

The above and other aspects, objects, and features of the present disclosure will become apparent from the following description of various embodiments, given in conjunction with the accompanying drawings.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

In one embodiment, commodity mobile devices as part of a crowdsourced system provides Satellite Vehicle (SV) Integrity Monitoring (referred to herein simply as SVIM) for a single satellite and/or for a constellation of satellite vehicles. In some embodiments, SVIM may be implemented in a crowdsourced system to verify the integrity of a satellite vehicle and GNSS constellation so sub-standard measurements and data can be avoided or the impact of problematic SV within a GNSS can be mitigated. In one embodiment, aspects of SVIM are implemented on a mobile device and/or a server to retrieve SVIM data from a field of crowdsourced mobile devices. For example, a mobile device may monitor a SV and/or a constellation of SVs and determine integrity metrics for particular SVs and/or the constellation. The integrity metrics may be provided to a server (e.g., in an integrity metric dataset or other data package/arrangement). In one embodiment, the server (e.g., a server capable of performing aspects of SVIM described herein) combines one or more aspects of the integrity metrics provided by the mobile device. In one embodiment, as a result of combining the crowdsourced integrity metrics from multiple individual mobile device sources, the server (or servers) can create/update a reference crowdsourced integrity report which may be used by mobile devices to optimize their positioning/location determination.

In some embodiments, SVIM as described here is used in addition to or instead of expensive specialized reference networks. For example, a GNSS integrity monitoring system may be built with dedicated worldwide reference networks, operating with dedicated fixed position reference sites. These dedicated non-mobile reference sites may utilize expensive stationary geodetic grade reference receivers, antennas, communication equipment, and one or more network processing centers. These networks and associated services may provide various atmospheric, orbital corrections and integrity monitoring to subscribers, however often at significant cost due to the expense of the stationary installations and the complexity of operating the sites.

Figure 1:
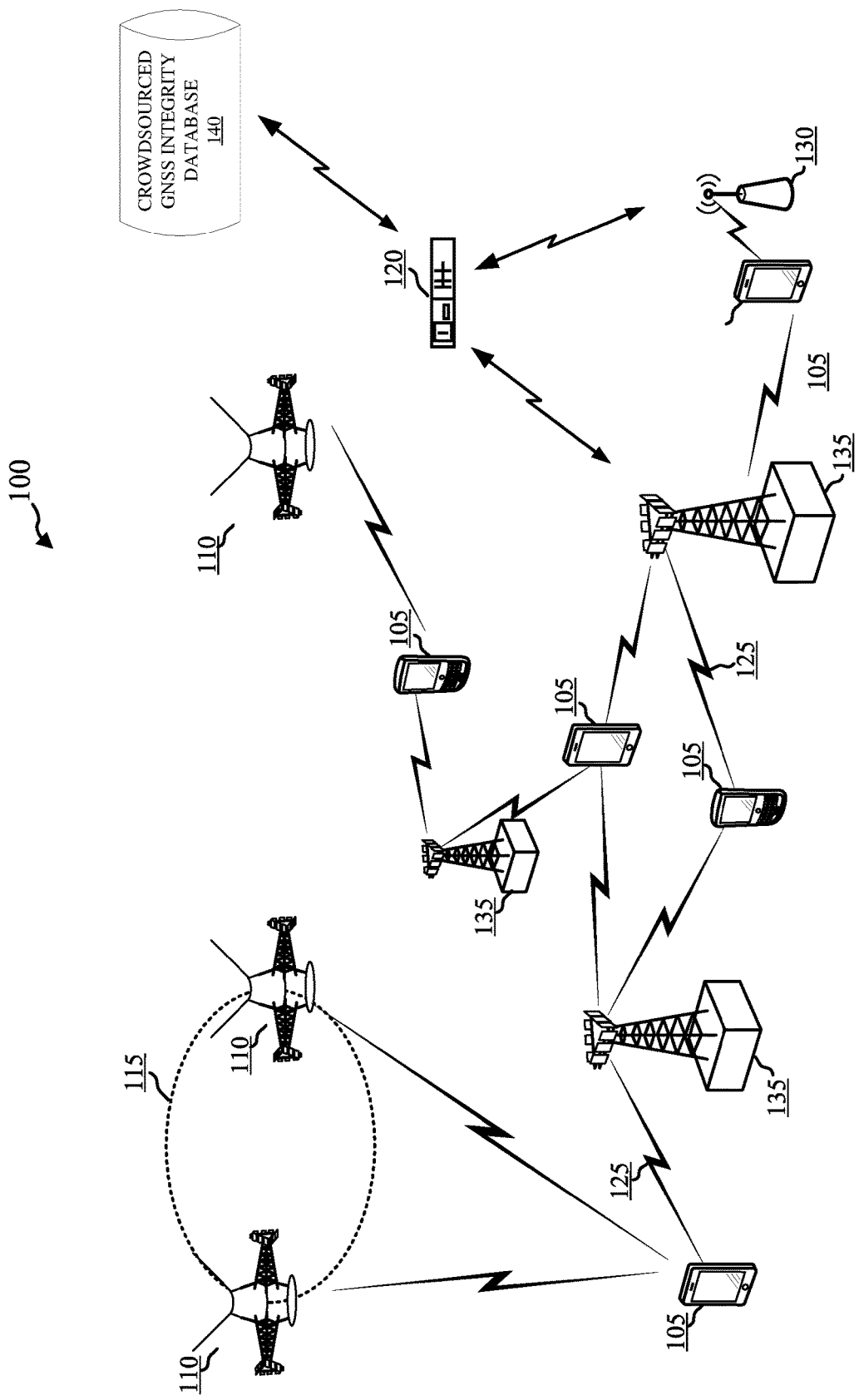
FIG. 1 illustrates a wireless communications operating environment for implementing SV Integrity Monitoring, in one embodiment.

FIG. 1 illustrates a wireless communications operating environment for performing SVIM, in one embodiment. In one embodiment, a SVIM system (e.g., FIG. 1 operating environment 100) includes a one or more mobile devices (e.g., mobile devices 105) which monitor one or more satellite vehicles (e.g., SVs 110) within a constellation (e.g., constellation 115). Mobile devices 105 may monitor one or more SVs 110 and report integrity metrics to other devices (e.g., to one or more of the field of mobile devices 105) or a server (e.g., server 120 which may be implemented with one or more aspects of SVIM) to determine a reference crowdsourced integrity report. In some embodiments, mobile devices 105 may create or update a reference crowdsourced integrity report locally at the device and send to server 120 or other mobile devices 105. In one embodiment, server 120 may retrieve monitoring data (e.g., integrity metrics such as integrity metrics in a dataset or other data package) or reference crowdsourced integrity reports from devices 105 and consolidate or combine known integrity data. In one embodiment, server 120 creates or updates a reference crowdsourced integrity report from the combined integrity data of multiple sources. The updated reference crowdsourced integrity report may be made available to mobile devices 105 so that mobile devices may achieve optimized positioning or location determination by avoiding or adjusting data from one or more SVs or constellations with questionable integrity. In some embodiments, server 120 maintains a crowdsourced GNSS integrity database 140 from the many mobile devices reporting integrity metrics. In some embodiments, crowdsourced GNSS integrity database 140 may be a separate device from server 120 or may be integrated into server 120.

In one embodiment, mobile devices within a crowdsourced environment provide integrity metrics to server 120 such that the integrity data from many sources can be used to determine particular problem areas (e.g., SV or constellations of questionable/suspect integrity). In some embodiments, a SVIM capable server combines the multiple incoming integrity metrics (e.g., multiple datasets from the same mobile device, and/or multiple datasets from multiple unique mobile devices) to create or update a reference crowdsourced integrity report (i.e., a global integrity report for a particular SV, constellation or GNSS). In one embodiment, a SVIM server receives updated integrity reports from a field of mobile devices each performing particular integrity monitoring.

In some embodiments a SVIM server or mobile device may manage the field of crowdsourced mobile devices to direct monitoring to particular SVs, constellations, geographic area, and/or data types. For example, a SVIM server may determine a particular SV or constellation has limited data points for establishing integrity and may actively request additional integrity metrics for that particular SV. In some embodiments, a SVIM server can determine a particular geographic area is relatively sparsely populated by integrity metrics and may actively request mobile devices within the area to provide one or more particular metrics. In some embodiments, the server may prune its integrity data based on time of acquiring the data. For example, integrity data may age at the server such that after a configurable amount of time has passed, the data may not be as reliable as newly acquired integrity data. In some embodiments, the server simply deletes old data, or may mark older data with a reduced confidence or reliability tag.

The server can combine reports to update the crowdsourced integrity report and can update mobile devices 105 as new data is determined. Therefore, integrity of individual SV and overall constellation integrity can be maintained by leveraging many inexpensive crowdsourced devices in a network. Data from mobile devices may be constantly provided to the server as mobile devices traverse particular geographic locations such that the server may have a nearly constant stream of integrity monitoring to process and analyze. In some embodiments, the server may produce updated reference crowdsourced integrity reports at set intervals, when incoming data meets a threshold, or other configurable parameter. In some embodiments a server may be manually triggered (e.g., by a server administrator) to update the reference crowdsourced integrity reports from available (i.e., received) crowdsourced integrity metrics stored at the server. In some embodiments, a particular event or condition may cause the server to update its reports. For example, if a new mobile software version is requested, if there is a known change in SV or constellation configurations, or other events.

In some embodiments, system 100 includes access points 130 (APs) within a Wireless Local Area Network (WLAN) and some of the AP 130 and BTS (Base Transceiver Station or wireless wide area network (WWAN) 135) may communicate with the mobile devices 105. For example, mobile devices 105 may send or receive updated integrity reports or integrity metrics to/from server 120 or other mobile devices through AP 130. Server 120 may additionally send a request for more or less integrity data to AP 130 or BTS 135 for distribution to mobile devices within their respective operating range. In some embodiments, mobile device 105 determines an initial position estimate utilizing on or more of AP 130 or BTS 135. In some embodiments, the position from AP 130 or BTS 135 may be used to verify position determined from constellation 115. Differences in position estimates from varying sources may be included in integrity metrics provided by mobile devices 105.

Mobile devices 105 may be dispersed throughout the wireless communications system 100. Mobile device 105 may also be referred to by those skilled in the art as a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. Mobile device 105 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. Mobile device 105 may be able to communicate over different access networks, such as cellular, Wireless Wide Area Network (WWAN), or Wireless Local Area Network (WLAN).

The communication links 125 shown in system 100 may include uplinks for carrying uplink or downlink transmissions (e.g., from mobile device 105 to a BTS 135). The communication links 125 shown in system 100 may also include signals received/monitored from SV 110 used in determining integrity metrics. For example, the navigation data broadcasted by a satellite can also be sent to a mobile through a ground communication network. In some embodiments, mobile device 105 can determine position based on mobile sensors, network, or mobile based positioning in addition to or instead of GNSS based positioning using SV 110.

In one embodiment, mobile devices within a SVIM system collect integrity metrics (e.g., measurement data) associated with a one or more particular satellite vehicle (e.g., SV 110 in a GNSS). In some embodiments, integrity measurement data may also be acquired from a wireless wide area network (e.g., WWAN 135), WiFi Access Points (e.g., AP 130), Micro-Electro-Mechanical Systems (MEMS), and other systems in addition to or instead of SV data. Integrity metrics collection (e.g., from monitoring one or more SVs) may occur in a constantly updating and/or recursive basis for one or more available mobile devices 105 in the SVIM system. The crowdsourced mobile devices 105 may be capable to perform multiple GNSS and hybrid position, velocity and time (PVT) calculations.

Integrity monitoring may occur locally at each device and also integrity monitoring data may be transferred between peers/servers within the SVIM system (e.g., to other mobile devices 105 and/or server(s) 120). In some embodiments, in response to or while performing PVT computations, the mobile system may perform computations for checking and addressing the integrity of GNSS data. For example SVIM can detect outliers and biases in over the air broadcast navigation parameters, signal quality, predicted and network assistance data (e.g., in the case of Assisted GNSS) and may make decisions about flagging, excluding SVs or constellations and taking corrective action in PVT computations. In one embodiment, the quantity and quality of the crowdsourced GNSS integrity monitoring data from a large number of worldwide mobile devices can provide a flexible and extensive warning or control mechanism.

In one embodiment, reference crowdsourced integrity reports can indicate which particular SVs, constellations, or geographic areas are of high integrity (i.e., operating within expected parameters). A mobile device may determine on a case by case basis or by a configuration setting/parameter how particular SVs, constellations, or geographic areas which have low integrity should be treated when performing GNSS based positioning. For example, low integrity components may be effectively offline or otherwise blacklisted from usage with mobile GNSS based positioning (e.g., low integrity rating is below a configurable threshold). For example, a particular SV or constellation may have received error reports from crowdsourced mobile devices to a great enough extent that mobile devices should be advised to disregard their signals when calculating GNSS based positioning. In some embodiments, certain geographic areas may be classified as more error prone due to some particular local interference specific to that area and the mobile device may have more accurate positioning results using alternative methods of positioning. For example, a geographic area, SV, or constellation may be actively jammed or subject to deliberate interference by hostile parties.

In some embodiments, reference crowdsourced integrity reports can include time sensitive integrity reports such that a mobile device is warned for using GNSS with a particular geographic area, SV, or constellation during particular time windows. For example, crowdsourced integrity metrics may detect a historical pattern of interference (e.g., a power plant may cause interference during certain times of operation) for which mobile devices may chose to switch to alternatives to one or more components of GNSS based positioning during a particularly troublesome time window.

Crowdsourcing of integrity monitoring using mobile devices (e.g., consumer mobile phones) can be a cheaper and more robust alternative to deploy for integrity monitoring and integrity assurance compared to operating a reference network with limited number of expensive and costly to maintain stationary reference stations.

In one embodiment, monitoring integrity of SV and constellations may include determining WLS (Weighed Least Squares) estimation RAIM (Receiver Autonomous Integrity Monitoring). For example, identifying and isolating faulty satellites or constellation by detecting ranging outliers in the measurements.

In one embodiment, monitoring integrity of SV and constellations may include KF (Kalman Filter) estimation RAIM. For example, checking the predicted measurements based KF states versus actual measurements.

In one embodiment, monitoring integrity of SV and constellations may include comparing WLS to KF and checking the result of the comparison with known or expected results/ranged. For example, comparing PVT solutions from WLS estimator and KF estimator (above).

In one embodiment, monitoring integrity of SV and constellations may include Cross-Kalman Filters checking (multiple filters running concurrently). For example, checking multiple/concurrent KF filters against each other.

In one embodiment, monitoring integrity of SV and constellations may include SV State (orbit and clock) validation. For example, satellite orbit and clock validation based on multiple sources.

In one embodiment, monitoring integrity of SV and constellations may include navigation data cross-checks (across different sources of navigation data: broadcast (for example, over the air decoded SV navigation messages), predicted (for example server predicted navigation data/orbital/clock information, network assistance (for example, AGNSS data/assisted GNSS data).

In one embodiment, monitoring integrity of SV and constellations may include external integrity information processing (periodic retrieval and injection of integrity information from integrity monitoring server). In some embodiment, multiple servers each provide external integrity information. For example, third party integrity information/data.

In one embodiment, monitoring integrity of SV and constellations may include an internal comparison of predicted vs. actual measurement acquisition. For example, if actual measurement is outside of a predicted threshold then SV position or clock may not be consistent.

In some embodiments, the one or more integrity metrics from one or more of the mobile device based SV integrity monitoring techniques includes pseudorange metrics between the mobile device and the one or more satellites. For example pseudo range may be the pseudo distance between a satellite and a navigation satellite receiver of the mobile device. For positioning the mobile device can determine its range to satellites as well as the SV positions at time of transmitting. With the SV's orbital parameters, these SV positions can be calculated for any point in time. The pseudorange of each satellite may be determined by multiplying the speed of light by the time the signal has taken from the satellite to the mobile device. Because of timing errors, the range is referred to as a "pseudo" range. Pseudorange metrics may include one or both of actual pseudorange measurements from satellites and/or residuals.

In some embodiments, the one or more integrity metrics includes pseudorange rate metrics between the mobile device and the one or more satellites. Compared to timing of the SV signal with respect to the mobile device internal clock, pseudorange rate includes frequency error and the contribution from Doppler shifts associated with motion. Pseudorange rate metrics may include one or both of actual pseudorange rate measurements from satellites and/or residuals.

In some embodiments, the one or more integrity metrics includes carrier phase metrics from the one or more satellites, signal strength for received satellite signals. The carrier phase metrics includes the measure of the range between a satellite and mobile device expressed in units of cycles of the carrier frequency. Carrier phase metrics may include one or both of actual carrier phase measurements from satellites and/or residuals.

In some embodiments, the one or more integrity metrics includes navigation messages from the one or more satellites. For example, satellites may receive operating data from a ground control station, and the data may be sent to the mobile devices as a navigation message. The navigation message can provide the mobile device with information to perform positioning. For example, the navigation message may include ephemeris parameters to compute satellite coordinates, time parameters and clock corrections, to compute satellite clock offsets and time conversions, service parameters with satellite health information to identify the navigation data set, ionospheric parameters for single frequency receivers, and almanacs for determining the position of all satellites in a constellation.

In some embodiments, the one or more integrity metrics includes determination of satellite signal integrity. In one embodiment, the satellite signal integrity confidence may be a binary value of confidence (e.g., yes confident in SV signal integrity, or not confident in SV signal integrity). In other embodiments, the confidence may be quantitative data, (e.g., percentage such as 100% confidence, 5% confidence etc.) or qualitative data, (e.g., scale such as high, low, medium confidence etc.) representation.

In some embodiments, the one or more integrity metrics includes a unique identifier of the mobile device and/or identifier of the server or identifier of particular signals, for example such as a universally unique identifier (UUID) used to identify information in computer systems.

In some embodiments, the one or more integrity metrics includes confidence rating for one or more other integrity metrics. For example, the confidence of any of the metrics herein (e.g., confidence in accuracy of the navigation message, pseudorange, pseudorange rate, unique identifier, carrier phase etc.) may have an associated rating which may be implemented in a variety of ways. In one embodiment, the confidence may be a binary value of confidence of one or more metrics. In other embodiments, the confidence may be quantitative data, (e.g., percentage such as 100% confidence, 5% confidence etc.) or qualitative data, (e.g., scale such as high, low, medium confidence etc.) representation.

In some embodiments one or more SVIM aspects described above in FIG. 1 are performed by, or is integrated into both a mobile device and server. SVIM may be implemented as software, firmware, hardware, modules, or engines of a mobile device and/or server (e.g., see device hardware 400 below with respect to FIG. 4).

Figure 2:
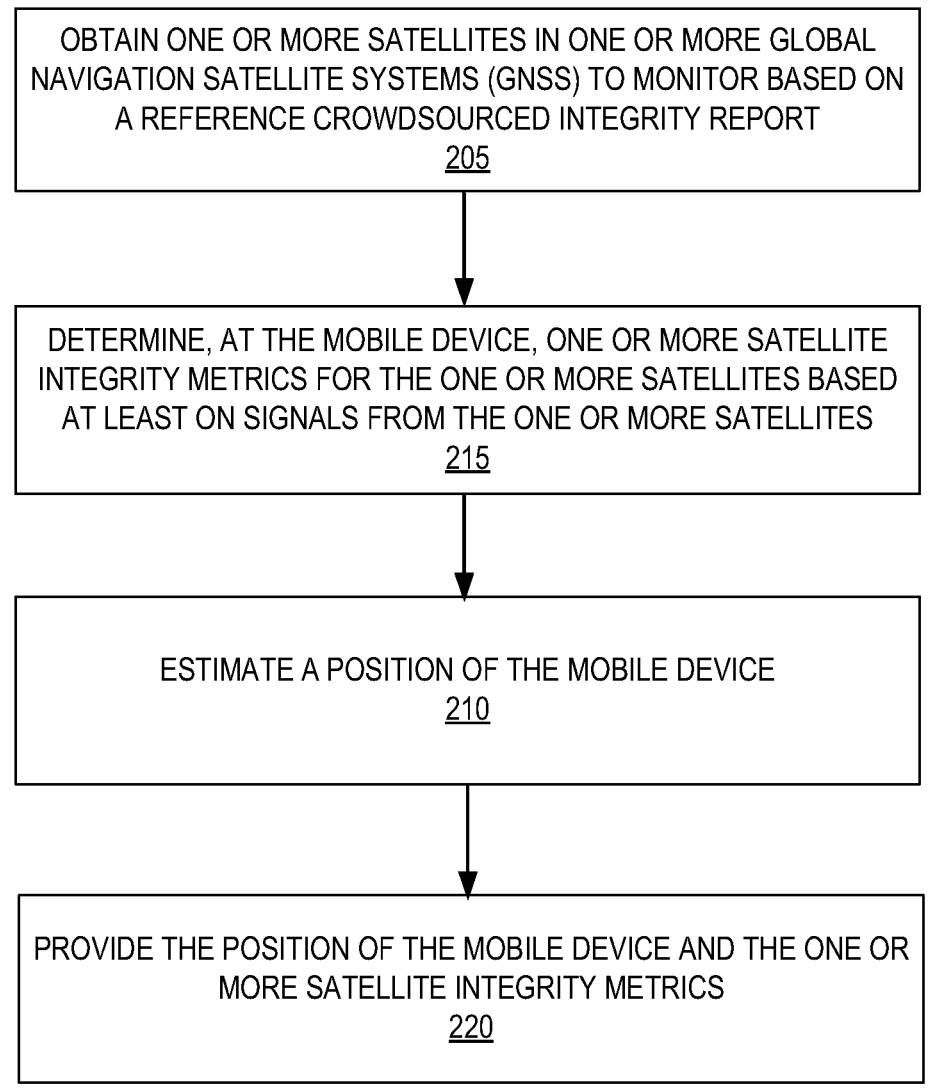
FIG. 2 is a flow diagram of a method for SV Integrity Monitoring implemented by a mobile device, in one embodiment.

FIG. 2 is a flow diagram of a method for a mobile device to monitor satellite integrity, in one embodiment. At block 205, an embodiment (for example, the method implemented by a SVIM capable device) obtains one or more satellites in one or more global navigation satellite systems (GNSS) to monitor based on a reference crowdsourced integrity report.

For example, the reference crowdsourced integrity report may include multiple SVs within a GNSS or multiple GNSS. The mobile device may refer to the reference crowdsourced integrity report to determine whether to monitor a particular SV or whether to adjust monitoring according to integrity reported by the reference crowdsourced integrity report. For example, the reference crowdsourced integrity report may specify one or more SV have suspect integrity and the mobile device may monitor suspect SV or may ignore the SV according to a configuration file at the mobile device or by user settings. In some embodiments, the reference crowdsourced integrity report may include adjustments to the way the mobile device monitors a particular SV.

In some embodiments the mobile device monitors, at the position of the mobile device, unknown/new one or more satellites to capture integrity metrics. For example, the reference crowdsourced integrity report may include a list or description of SV for which other mobile devices have reported integrity to the server. However, in some cases, the mobile device may determine that new SV not listed or documented in the reference crowdsourced integrity report should be monitored. In some embodiments, the reference crowdsourced integrity report has a flag or command for the mobile device to provide information on SVs not detailed within the reference crowdsourced integrity report or for SVs where integrity data is minimal or missing for particular SVs.

In one embodiment, the reference crowdsourced integrity report may include integrity determination of one or more satellites, constellations, or geographic areas. In one embodiment, the integrity determination may be a binary value of integrity for the respective satellite. In other embodiments, the integrity may be expressed as quantitative data, e.g. percentage (100% confidence, 5% confidence etc.) or qualitative data, e.g. scale (high, low, medium confidence etc.) representation. In some embodiments, the integrity determination may be determined according to processing integrity metrics received from many mobile devices in the crowdsourced network of devices.

In one embodiment, the reference crowdsourced integrity report may include expected reliability of each integrity determination. For example, if the integrity determination is from a limited number of mobile devices, or within a limited time window, the expected reliability of the particular integrity determination may be lower than an integrity determination from a large number of unique devices across a varied time window. In some embodiments, the quality of the particular mobile device or the geographic area where the metrics were determined may also influence the expected reliability.

In one embodiment, the reference crowdsourced integrity report may include expected signal strength of a satellite signal. For example, expected based on reference crowdsourced data or based on what would be an expected general signal strength.

In one embodiment, the reference crowdsourced integrity report may include expected accuracy of a satellite signal. For example, User Ranging Accuracy (URA) from broadcast signals and User Ranging Error (URE) determined actual error.

In one embodiment, the reference crowdsourced integrity report may include time of applicability for one or more aspects of the reference crowdsourced integrity report. For example, integrity metrics may have individual time of applicability, or have a reference time for the entire report such as time since generated, how long to apply, etc.

In one embodiment, the reference crowdsourced integrity report may include geographic area associated with one or more aspects of the reference integrity report. For example, geographic area may be determined from a source identifier of the reference crowdsourced integrity report, SV, constellation, mobile device, or server.

In one embodiment, the reference crowdsourced integrity report may include any combination of the above described aspects.

At block 215, the embodiment determines, at the mobile device, one or more satellite integrity metrics for the one or more satellites based at least on signals from the one or more satellites. In some embodiments, the one or more satellite integrity metrics includes a signal identifier for the one or more satellites. For example, the signal identifier may be used by the mobile device to determine the satellite source information for one or more signals.

At block 210, the embodiment estimates a position of the mobile device. In some embodiments, the estimated position may be a PVT of the mobile device. In some embodiments position may also include acceleration of the mobile device at a particular moment in time. PVT may be determined by AP based positioning, mobile sensor dead reckoning or other positioning methods in addition to or instead of GNSS based positioning. At block 220, the embodiment provides the position of the mobile device and the one or more satellite integrity metrics. In some embodiments, the mobile device automatically sends position and metrics to a respective server for combination and processing. In other embodiments, the mobile device may hold data until a request by a server or other mobile device. In some embodiments, the mobile device selects, according to relevance for an updated integrity report, a subsection of the captured integrity metrics for inclusion in the integrity metrics provided to a server or other mobile devices. For example, the mobile device may not always send all monitored data for all SVs or constellations. In some embodiments, the mobile device selectively monitors particular metrics or selectively provides data according to server need or request.

In one embodiment either or both a server and/or the mobile device can create or update integrity reports. In one embodiment, creating the updated integrity report further comprises one or more of: determining WLS (Weighed Least Squares) estimation of Receiver Autonomous Integrity Monitoring (RAIM) measurement data from a plurality of devices, Kalman Filter estimation RAIM from the plurality of devices, comparing the WLS estimation to the KF estimation, cross checking with Kalman Filters of a plurality of measurement data filters, fault detection and verification or release of suspect satellites, cross-checking navigation data across a plurality of different sources of navigation data, or any combination thereof.

In one embodiment the updated integrity report includes an integrity determination for one or more constellations of satellites. The integrity of a particular satellite within a constellation may affect the overall integrity when utilizing the particular constellation.

In some embodiments, the mobile device receives an updated crowdsourced integrity report where the updated crowdsourced integrity report was updated (e.g., by the server receiving integrity metrics) according to at least some of the integrity metrics sent to the server. For example, the mobile device may discover integrity anomalies or confirm data that, when received by the server, triggers the server to create an updated crowdsourced report. In some embodiments, as a benefit of being part of the crowdsourced group of mobile devices providing integrity metrics, the mobile device may receive updated integrity reports. For example, the mobile device may be subscribed to integrity updates from the server as they are released or in response to changes in reports. In one embodiment, a device utilizes the updated integrity report for GNSS improved assisted navigation or positioning. For example, the device may receive GNSS positioning data and determine the position of the mobile device using the GNSS positioning data. In some embodiments, the device determines a position from the GNSS including the satellite without reliance on the integrity report and may adjust the position according to the integrity report to provide an adjusted GNSS position of the device. The device may use integrity information for a particular SV to determine how to adjust internal positioning systems of the device. For example, if SV "A" is known to be faulty and provide measurements with "X" amount of error the mobile device may attempt to compensate for the faulty measurements provided by satellite "A". In another example, the mobile device may determine the error for satellite "A" is too great to compensate for and therefore the mobile device may ignore all data from the satellite, such that GNSS location does not rely on satellite "A" for determining mobile device location.

The device may adjust the GNSS positioning data according to the updated integrity report for the satellite and determine a current location of the device according to the adjusted GNSS positioning data. In some embodiments, for a known bad satellite, a mobile device may disable precise tracking to save power.

In some embodiments, the mobile device (e.g., device 105 of FIG. 1) receives a reference crowdsourced integrity report from a server (e.g., server 120 of FIG. 1). In some embodiments, the device sends updated integrity reports to the server or other mobile devices in addition to or instead of reference crowdsourced integrity reports. For example, as introduced above, the mobile device may be able to make updates to a local integrity report (e.g., either based upon the reference integrity report or a new local version integrity report) based on observed integrity metrics. The mobile device may use the locally created/updated integrity report for positioning or share the report with other devices/servers.

Figure 3:
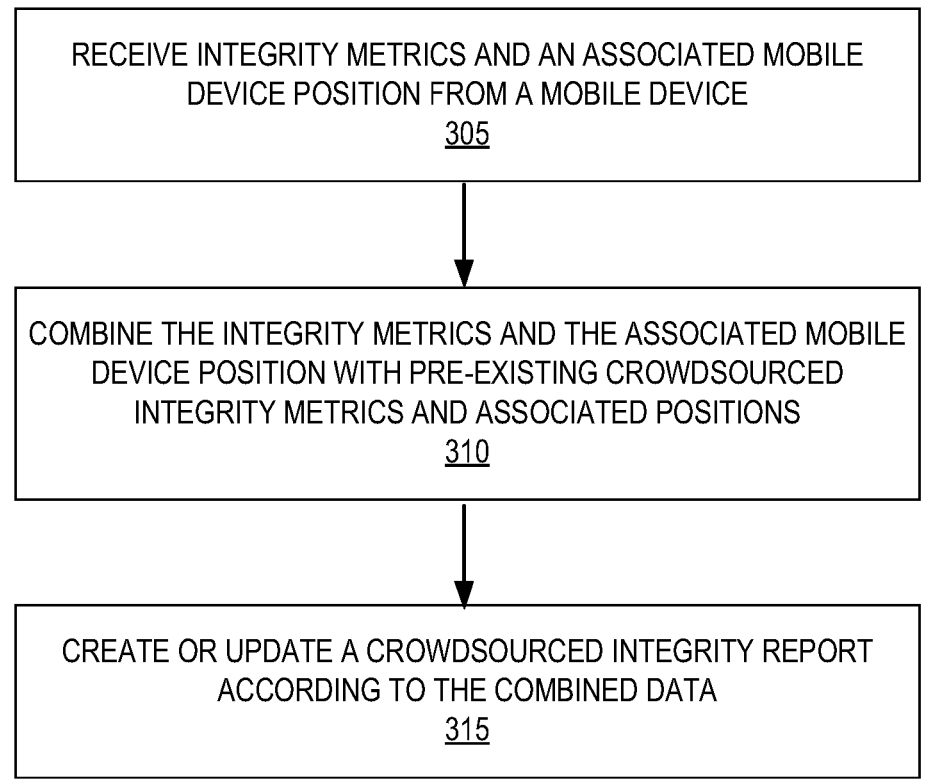
FIG. 3 is a flow diagram of a method for SV Integrity Monitoring implemented by a server, in one embodiment.

FIG. 3 is a flow diagram of a method for a server to monitor satellite integrity. At block 305, the embodiment (e.g., a server in the SVIM) receives integrity metrics and an associated position from a mobile device. For example, the integrity metrics and associated position may be as described above with respect to FIG. 2. The server may receive multiple integrity metrics (e.g., metrics from individual mobile devices may be bundled or otherwise packaged into a dataset such that the server can associate/tag metrics to a particular source) and associated positions from one or more mobile devices in a crowdsourced network.

At block 310, the embodiment combines the integrity metrics and the associated mobile device position with pre-existing crowdsourced integrity metrics and associated positions. For example, old data may have less weighting and new data may have greater weight such that reprocessing all data can generate a new combined result. In some embodiments new data is used for generating the new report for cross checking with older reports and new reports may have greater 'age' weighting than old reports. In some embodiments the old and new reports may have different regional information and the different regional information may be combined. In some embodiments, pre-existing data may be a combination of one or more previously received integrity metrics and the associated mobile device positions from one or more other mobile devices and the server may store this data for combination with new updated data.

Incoming server data may be any combination from new and unique mobile devices and/or from previously known mobile devices.

At block 315, the embodiment creates or updates a crowdsourced integrity report according to the combined data from block 310. For example, in some embodiments the server receives integrity metrics from the plurality of mobile devices and creates a reference crowdsourced integrity report as introduced above with FIG. 2. In some embodiments, one or more servers continuously receive crowdsourced integrity metrics from a plurality of mobile devices and update the crowdsourced integrity metrics as new information is received.

In some embodiments, the server receives a third party integrity report and incorporates the third party integrity data into updated crowdsourced integrity reports which may be distributed to mobile devices within the SVIM system (e.g., system 100 of FIG. 1). In some embodiments, third party integrity reports may be limited to use/not-use flags for satellites. The third party integrity reports may be taken into account when combining other integrity data. For example, in the process of updating the crowdsourced integrity report, the weight or influence of use/not-use flags may be adjusted depending on the estimated quality of the third party integrity report compared to all perceived quality of other available integrity data.

Figure 4:
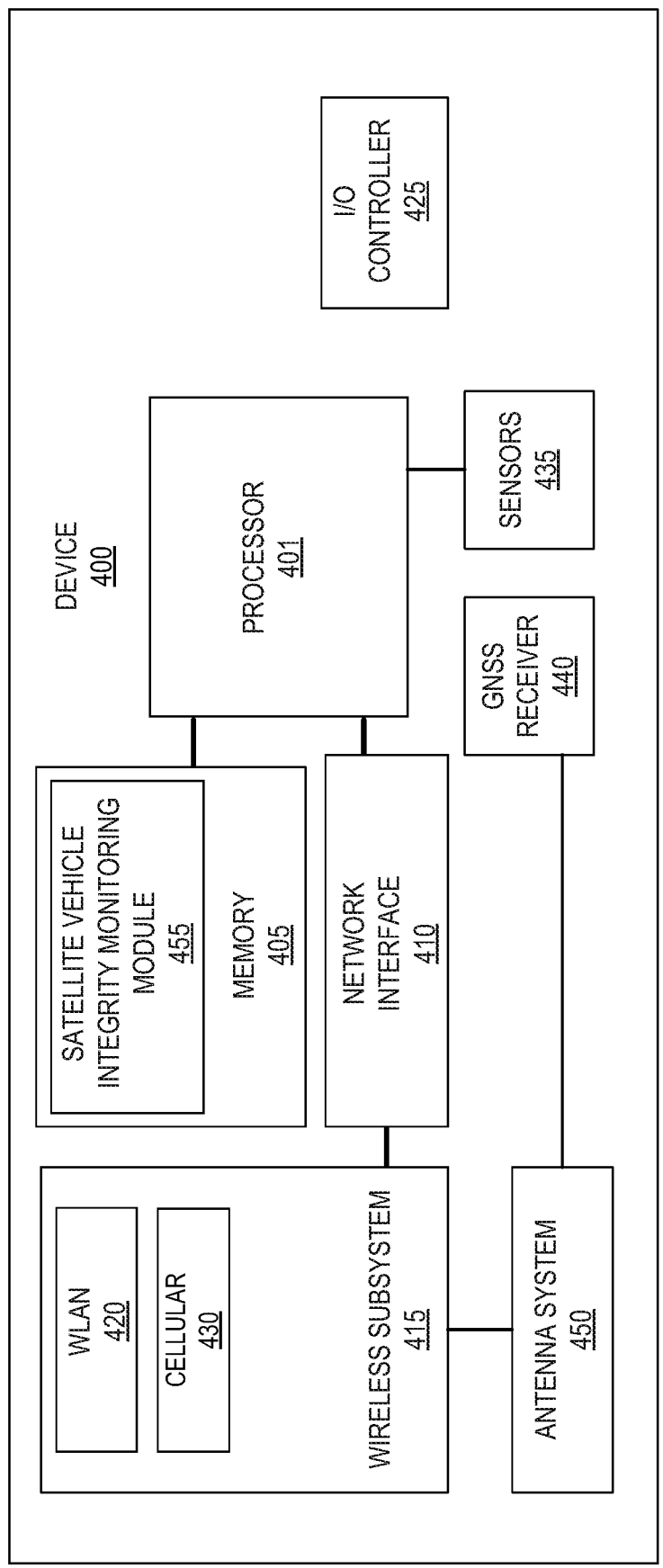
FIG. 4 illustrates an exemplary device to perform SV Integrity Monitoring.

FIG. 4 is block diagram illustrating a device to perform SVIM, in one embodiment. Device 400 may include one or more processors 401 (for example, a general purpose processor, specialized processor, or digital signal processor), a memory 405, I/O controller 425, and network interface 410. It should be appreciated that device 400 may also include (not shown) a display, a user interface (I/F) (for example, keyboard, touch-screen, or similar devices), a power device (for example, a battery or power supply), as well as other components typically associated with electronic devices. In some embodiments, device 400 may be a mobile or non-mobile device, for example device 400 may be a server such as server 120 of FIG. 1 or mobile device such as mobile device 105 of FIG. 1.

The device 400 may also include a number of device sensors 435 coupled to one or more buses or signal lines further coupled to the processor(s) 401. The sensors 435 may include a clock, ambient light sensor (ALS), accelerometer, gyroscope, magnetometer, temperature sensor, barometric pressure sensor, red-green-blue (RGB) color sensor, ultra-violet (UV) sensor, UV-A sensor, UV-B sensor, compass, proximity sensor. The wireless device may also include a Global Positioning System (GPS) or GNSS receiver 440 which may enable GPS or GNSS measurements in support of A-GNSS positioning. In some embodiments, multiple cameras are integrated or accessible to the wireless device. In some embodiments, other sensors may also have multiple versions or types within a single wireless device.

Memory 405 may be coupled to processor 401 to store instructions (for example, instructions to perform SVIM) for execution by processor 401. In some embodiments, memory 405 is non-transitory. Memory 405 may also store software or firmware instructions (e.g. for one or more programs or modules) to implement embodiments described herein such as SVIM embodiments described in association with FIG. 2, and FIG. 3. Thus, the memory 405 is a processor-readable memory and/or a computer-readable memory that stores software code (programming code, instructions, etc.) configured to cause the processor 401 to perform the functions described herein. Alternatively, one or more functions of SVIM may be performed in whole or in part in device hardware (e.g., as implemented in an SVIM module 455).

Memory 405 may also store data from integrated or external sensors. In addition, memory 405 may store application program interfaces (APIs) for providing access to one or more features of SVIM as described herein. In some embodiments, SVIM functionality can be implemented in memory 405. In other embodiments, SVIM functionality can be implemented as a module separate from other elements in the device 400. The SVIM module 455 may be wholly or partially implemented by other elements illustrated in FIG. 4, for example in the processor 401 and/or memory 405, or in one or more other elements of the device 400.

Network interface 410 may also be coupled to a number of wireless subsystems 415 (for example, WLAN 420, Cellular 430, or other networks) to transmit and receive data streams through a wireless antenna system 450 to/from a wireless network or through a wired interface for direct connection to networks (for example, the Internet, Ethernet, or other wireline systems). Wireless subsystems 415 may be connected to antenna system 450. Antenna system 450 may be connected to GPS or GNSS receiver 440 to enable reception of GPS or other GNSS signals by GPS or GNSS receiver 440. Antenna system 450 may comprise a single antenna, multiple antennas and/or an antenna array and may include antennas dedicated to receiving and/or transmitting one type of signal (e.g. cellular, WiFi or GNSS signals) and/or may include antennas that are shared for transmission and/or reception of multiple types of signals. WLAN subsystem 420 may comprise suitable devices, hardware, and/or software for communicating with and/or detecting signals from WiFi APs and/or other wireless devices within a network (e.g. femtocells). In one aspect, WLAN subsystem 420 may comprise a WiFi (802.11x) communication system suitable for communicating with one or more wireless access points.

Cellular subsystem 430 may include one or more wide area network transceiver(s) that may be connected to one or more antennas in antenna system 450. The wide area network transceivers may comprise suitable devices, hardware, and/or software for communicating with and/or detecting signals to/from other wireless devices within a network. In one aspect, the wide area network transceivers may comprise a code division multiple access (CDMA) communication system suitable for communicating with a CDMA network of wireless base stations; however in other aspects, the wide area network transceivers may support communication with other cellular telephony networks or femtocells, such as, for example, time division multiple access (TDMA), Long-Term Evolution (LTE), Advanced LTE, Wideband Code Division Multiple Access (WCDMA), Universal Mobile Telecommunications System (UMTS), 4G, or Global System for Mobile Communications (GSM). Additionally, any other type of wireless networking technologies may be supported and used by device 400, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT). Using AFLT, a server may compute a position for device 400 from phase measurements made by device 400 of pilot signals transmitted from a plurality of base stations.

In one embodiment, device 400 implemented as a mobile device stores instructions (for example, within memory 405) executable by processor 401 to determine a reference position, receive signals (for example, via network interface 410) from BTSs, and determine mobile device position based on signals from the BTSs. Memory 405 may also store instructions to detect one or more unreliable BTSs based mobile device positioning measurement quality based on the plurality of BTSs and/or range measurement quality. Device 400 may also provide (for example, via network interface 410 and wireless subsystem 415) a status report including BTS data and mobile device data.

The device as used herein (for example, device 400) may be a: wireless device, cell phone, internet of things device, personal digital assistant, mobile computer, wearable device (for example, watch, head mounted display, virtual reality glasses, etc.), tablet, personal computer, wireless terminal, laptop computer, or any type of device that has wireless capabilities. As used herein, a wireless device may be any portable, or movable device or machine that is configurable to acquire wireless and/or SV signals transmitted from, and transmit wireless signals to, one or more wireless communication devices or networks. Thus, by way of example but not limitation, the device 400 may include a radio device, a cellular telephone device, a computing device, a personal communication system device, or other like movable wireless communication equipped device, appliance, or machine. The term "device" is also intended to include devices which communicate with a personal navigation device, such as by short-range wireless, infrared, wireline connection, or other connection—regardless of whether SV signal reception, assistance data reception, and/or position-related processing occurs at the device 400. Also, the term "device" is intended to include all devices, including wireless communication devices, wireless terminals, cell phones, computers, laptops, etc. which are capable of communication with a server, such as via the Internet, WiFi, or other network, and regardless of whether satellite signal reception, assistance data reception, and/or position-related processing occurs at the wireless device, at a server, or at another wireless device associated with the network. Any operable combination of the above can also be considered a "device" as used herein. Other uses may also be possible. While various examples given in the description below relate to wireless devices, the techniques described herein can be applied to other devices.

The device may communicate wirelessly with a plurality of APs, base stations and/or femtocells using RF signals (for example, 400 MHz, 1900 MHz, 2.4 GHz, 4.6 GHz, and 4.9/5.0 GHz bands) and standardized protocols for the modulation of the RF signals and the exchanging of information. For example, the protocol may be Institute of Electrical and Electronics Engineers (IEEE) 802.11x or 3GPP LTE. By extracting different types of information from the exchanged signals, and utilizing the layout of the network (i.e., the network geometry) the wireless device may determine its position within a predefined reference coordinate system.

It should be appreciated that embodiments of the invention as will be hereinafter described may be implemented through the execution of instructions, for example as stored in the memory 405 or other element, by processor 401 of device 400 and/or other circuitry of device 400 and/or other devices. Particularly, circuitry of device 400, including but not limited to processor 401, may operate under the control of a program, routine, or the execution of instructions to execute methods or processes in accordance with embodiments of the invention. For example, such a program may be implemented in firmware or software (e.g. stored in memory 405 and/or other locations) and may be implemented by processors, such as processor 401, and/or other circuitry of device 400. Further, it should be appreciated that the terms processor, microprocessor, circuitry, controller, etc., may refer to any type of logic or circuitry capable of executing logic, commands, instructions, software, firmware, functionality and the like.

Some or all of the functions, engines or modules described herein (for example, SVIM features and methods illustrated in at least FIG. 2 and FIG. 3) may be performed by the device 400 itself (for example, via instructions of module 455 stored in memory 405). For example, device 400 for refining a radio frequency (RF) time of arrival (TOA) may comprise memory 405 and processor 401 coupled to the memory. The memory 405 and processor 401 may be configured to: obtain one or more satellites in one or more global navigation satellite systems (GNSS) to monitor based on a reference crowdsourced integrity report; determine, at the mobile device, one or more satellite integrity metrics for the one or more satellites based at least on signals from the one or more satellites; estimate a position of the mobile device; and provide the position of the mobile device and the one or more satellite integrity metrics.

In some embodiments, device 400 provides the means for implementing the SVIM described herein (for example, at least with respect to the features of FIGS. 2 and 3 above). In one embodiment, device 400 is an apparatus to provide means for obtaining one or more satellites in one or more global navigation satellite systems (GNSS) to monitor based on a reference crowdsourced integrity report; means for determining, at the mobile device, one or more satellite integrity metrics for the one or more satellites based at least on signals from the one or more satellites; means for estimating a position of the mobile device; and means for providing the position of the mobile device and the one or more satellite integrity metrics.

In some embodiments or some or all of the functions, engines or modules described herein may be performed by another system connected through I/O controller 425 or network interface 410 (wirelessly or wired) to the device. Thus, some and/or all of the functions may be performed by another system and the results or intermediate calculations may be transferred back to the wireless device. In some embodiments, such other device may comprise a server configured to process information in real time or near real time. In some embodiments, the other device is configured to predetermine the results, for example based on a known configuration of the device. Further, one or more of the elements illustrated in FIG. 4 may be omitted from the device 400. For example, one or more of the sensors 435 may be omitted in some embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (for example, a server or device). It will be recognized that various actions described herein can be performed by specific circuits (for example, application specific integrated circuits), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a mobile device to monitor satellite integrity, the method comprising:
   obtaining information regarding one or more satellites in one or more global navigation satellite systems (GNSS) to monitor;
   determining, at the mobile device, one or more satellite integrity metrics for the one or more satellites, based at least on signals from the one or more satellites;
   estimating a position of the mobile device;

receiving, by the mobile device and from a second mobile device, a server or both, a request for particular crowdsourced metrics;
selecting, by the mobile device, a subset of the one or more satellite integrity metrics for the one or more satellites, based on the request for particular crowdsourced metrics; and
providing, to the second mobile device, the server or both, the position of the mobile device and the subset of the one or more satellite integrity metrics.

2. The method of claim 1, wherein the one or more satellite integrity metrics include one or more of:
pseudorange rate metrics between the mobile device and the one or more satellites,
carrier phase metrics from the one or more satellites,
signal strength for received satellite signals,
navigation messages from the one or more satellites,
determination of satellite signal integrity,
confidence rating for the one or more satellite integrity metrics, or
any combination thereof.

3. The method of claim 1, further comprising receiving, by the mobile device, a reference crowdsourced integrity report, wherein the reference crowdsourced integrity report comprises one or more of:
integrity determination of one or more satellites,
integrity determination of one or more constellations,
integrity determination of one or more geographic areas,
expected reliability of each integrity determination,
expected signal strength of a satellite signal,
expected accuracy of a satellite signal,
time of applicability for one or more aspects of the reference crowdsourced integrity report,
geographic area associated with one or more aspects of the reference crowdsourced integrity report, or
any combination thereof.

4. The method of claim 1, further comprising receiving, in response to providing the position and the subset of the one or more satellite integrity metrics, and from the second mobile device, the server or both, an updated crowdsourced integrity report,
wherein the updated crowdsourced integrity report includes information from the provided subset of the one or more satellite integrity metrics.

5. The method of claim 1, wherein the estimated position of the mobile device is determined at least in part on a GNSS based position, and wherein the GNSS based position is determined at least in part on a reference crowdsourced integrity report.

6. The method of claim 1, wherein the obtaining the information regarding the one or more satellites in the one or more global navigation satellite systems (GNSS) to monitor comprises:
obtaining information regarding satellites currently detected by the mobile device that are missing from a reference crowdsourced integrity report.

7. A mobile device to monitor satellite integrity, the mobile device comprising:
memory; and
a processor coupled to the memory and the processor configured to:
obtain information regarding one or more satellites in one or more global navigation satellite systems (GNSS) to monitor;
determine, at the mobile device, one or more satellite integrity metrics for the one or more satellites based at least on signals from the one or more satellites;
estimate a position of the mobile device;
receive, from a second mobile device, a server or both, a request for particular crowdsourced metrics;
select a subset of the one or more satellite integrity metrics for the one or more satellites, based on the request for particular crowdsourced metrics; and
provide, to the second mobile device, the server or both, the position of the mobile device and the subset of the one or more satellite integrity metrics.

8. The mobile device of claim 7, wherein the one or more satellite integrity metrics include one or more of:
pseudorange rate metrics between the mobile device and the one or more satellites,
carrier phase metrics from the one or more satellites,
signal strength for received satellite signals,
navigation messages from the one or more satellites,
determination of satellite signal integrity,
confidence rating for the one or more satellite integrity metrics, or
any combination thereof.

9. The mobile device of claim 7, wherein the processor is configured to receive a reference crowdsourced integrity report that comprises one or more of:
integrity determination of one or more satellites,
integrity determination of one or more constellations,
integrity determination of one or more geographic areas,
expected reliability of each integrity determination,
expected signal strength of a satellite signal,
expected accuracy of a satellite signal,
time of applicability for one or more aspects of the reference crowdsourced integrity report,
geographic area associated with one or more aspects of the reference crowdsourced integrity report, or
any combination thereof.

10. The mobile device of claim 7, wherein the processor is further configured to receive, in response to providing the position and the subset of the one or more satellite integrity metrics, and from the second mobile device, the server or both, an updated crowdsourced integrity report,
wherein the updated crowdsourced integrity report includes information from the provided subset of the one or more satellite integrity metrics.

11. The mobile device of claim 7, wherein the estimated position of the mobile device is determined at least in part on a GNSS based position, and wherein the GNSS based position is determined at least in part on a reference crowdsourced integrity report.

12. The mobile device of claim 7, wherein the processor configured to obtain information regarding the one or more satellites in the one or more global navigation satellite systems (GNSS) to monitor is further configured to:
obtain information regarding satellites currently detected by the mobile device that are missing from a reference crowdsourced integrity report.

13. A machine readable non-transitory storage medium having stored therein instructions that are executable by a processor to:
obtain information regarding one or more satellites in one or more global navigation satellite systems (GNSS) to monitor;
determine, at a mobile device, one or more satellite integrity metrics for the one or more satellites based at least on signals from the one or more satellites;
estimate a position of the mobile device;
receive, from a second mobile device, a server or both, a request for particular crowdsourced metrics;

select a subset of the one or more satellite integrity metrics for the one or more satellites, based on the request for particular crowdsourced metrics; and provide, to the second mobile device, the server or both, the position of the mobile device and the subset of the one or more satellite integrity metrics.

14. The machine readable non-transitory storage medium of claim 13, wherein the one or more satellite integrity metrics include one or more of:

pseudorange rate metrics between the mobile device and the one or more satellites, carrier phase metrics from the one or more satellites, signal strength for received satellite signals, navigation messages from the one or more satellites, determination of satellite signal integrity, confidence rating for the one or more satellite integrity metrics, or any combination thereof.

15. The machine readable non-transitory storage medium of claim 13, wherein the instructions are executable by the processor to receive a reference crowdsourced integrity report that comprises one or more of:

integrity determination of one or more satellites, integrity determination of one or more constellations, integrity determination of one or more geographic areas, expected reliability of each integrity determination, expected signal strength of a satellite signal, expected accuracy of a satellite signal, time of applicability for one or more aspects of the reference crowdsourced integrity report, geographic area associated with one or more aspects of the reference crowdsourced integrity report, or any combination thereof.

16. The machine readable non-transitory storage medium of claim 13, wherein the instructions that are executable by the processor further include program instructions that are executable by the processor to receive, in response to providing the position and the subset of the one or more satellite integrity metrics, and from the second mobile device, the server or both, an updated crowdsourced integrity report, wherein the updated crowdsourced integrity report includes information from the provided subset of the one or more satellite integrity metrics.

17. The machine readable non-transitory storage medium of claim 13, wherein the estimated position of the mobile device is determined at least in part on a GNSS based position, and wherein the GNSS based position is determined at least in part on a reference crowdsourced integrity report.

18. The machine readable non-transitory storage medium of claim 13, wherein the instructions to obtain information regarding the one or more satellites in the one or more global navigation satellite systems (GNSS) to monitor comprises instructions to:

obtain information regarding satellites currently detected by the mobile device that are missing from a reference crowdsourced integrity report.

19. An apparatus to verify satellite integrity, the apparatus comprising:

means for obtaining information regarding one or more satellites in one or more global navigation satellite systems (GNSS) to monitor;

means for determining, at a mobile device, one or more satellite integrity metrics for the one or more satellites, based at least on signals from the one or more satellites;

means for estimating a position of the mobile device;

means for receiving, by the mobile device and from a second mobile device, a server or both, a request for particular crowdsourced metrics;

means for selecting, at the mobile device, a subset of the one or more satellite integrity metrics for the one or more satellites, based on the request for particular crowdsourced metrics; and means for providing, to the second mobile device, the server or both, the position of the mobile device and the subset of the one or more satellite integrity metrics.

20. The apparatus of claim 19, wherein the one or more satellite integrity metrics include one or more of:

pseudorange rate metrics between the mobile device and the one or more satellites, carrier phase metrics from the one or more satellites, signal strength for received satellite signals, navigation messages from the one or more satellites, determination of satellite signal integrity, confidence rating for the one or more satellite integrity metrics, or any combination thereof.

21. The apparatus of claim 19, wherein the apparatus comprises means for receiving a reference crowdsourced integrity report that comprises one or more of:

integrity determination of one or more satellites, integrity determination of one or more constellations, integrity determination of one or more geographic areas, expected reliability of each integrity determination, expected signal strength of a satellite signal, expected accuracy of a satellite signal, time of applicability for one or more aspects of the reference crowdsourced integrity report, geographic area associated with one or more aspects of the reference crowdsourced integrity report, or any combination thereof.

22. The apparatus of claim 19, further comprising means for receiving, in response to providing the position and the subset of the one or more satellite integrity metrics, and from the second mobile device, the server or both, an updated crowdsourced integrity report, wherein the updated crowdsourced integrity report includes information from the provided subset of the one or more satellite integrity metrics.

23. The apparatus of claim 19, wherein the estimated position of the mobile device is determined at least in part on a GNSS based position, and wherein the GNSS based position is determined at least in part on a reference crowdsourced integrity report.

24. The apparatus of claim 19, wherein the means for obtaining information regarding the one or more satellites in the one or more global navigation satellite systems (GNSS) to monitor comprises:

means for obtaining information regarding satellites currently detected by the mobile device that are missing from a reference crowdsourced integrity report.

* * * * *